United States Patent [19]
Park et al.

[11] Patent Number: 5,640,265
[45] Date of Patent: Jun. 17, 1997

[54] OPTICAL SCANNING APPARATUS

[75] Inventors: Chang Jin Park, Kyunggi-do; Dong Hoon Kang; Chul Woo Lee, both of Seoul, all of Rep. of Korea

[73] Assignee: Samsung Electro-Mechanics Co., Ltd., Kyunggi-do, Rep. of Korea

[21] Appl. No.: 563,813

[22] Filed: Nov. 28, 1995

[30] Foreign Application Priority Data

Nov. 30, 1994 [KR] Rep. of Korea .................. 9431911

[51] Int. Cl.$^6$ .................................................. G02B 26/08
[52] U.S. Cl. .................. 359/206; 359/207; 359/216; 359/217; 359/662; 359/717
[58] Field of Search .......................... 359/205–207, 359/216–219, 708, 710, 717–718, 662; 347/258–261

[56] References Cited

U.S. PATENT DOCUMENTS

| 3,750,189 | 7/1973 | Fleischer | 359/206 |
|---|---|---|---|
| 4,775,205 | 10/1988 | Muramatsu | 359/205 |
| 5,179,465 | 1/1993 | Kondo | 359/206 |

FOREIGN PATENT DOCUMENTS 5-161410  6/1993  Japan.

*Primary Examiner*—James Phan
*Attorney, Agent, or Firm*—Lowe, Price, LeBlanc & Becker

[57] ABSTRACT

This invention discloses an optical scanning apparatus which gives an F-θ function by means of an axis-symmetric aspherical lens serving as a scanning lens and facilitates the manufacture, assembly and adjustment of the lens by providing a cylindrical lens between a rotating polygon mirror and the axis-symmetric aspherical lens. According to this invention, two lenses which may be injection moulded and use plastic material form an optical scanning system. The cylindrical lens of these two lenses is located between the rotating polygon mirror and the scanning lens for image-forming light in the subscanning direction, the scanning lens of these two lenses is located between the cylindrical lens and the image formation plane for image-forming light in the mainscanning direction. Also, magnification of the mainscanning direction and that of the subscanning direction are independent.

17 Claims, 4 Drawing Sheets

OPTICAL SCANNING APPARATUS

BACKGROUND OF THE INVENTION

1. Field of the Invention

This invention relates to an optical scanning apparatus in optical equipment using such an optical system such as a laser beam printer and so on, and more particularly to an optical scanning apparatus which gives an F-theta (F-θ) function by means of an axis-symmetric aspherical lens and facilitates the manufacture, assembly and adjustment of a lens by providing a cylindrical lens between a rotating polygon mirror and the axis-symmetric aspherical lens.

2. Description of the Prior Art

Recently, optical equipment using a laser, for example a laser printer, laser scanning micrometer (LCM), pattern generator, etc., has been developed. Ordinarily, an optical system applying a laser is composed of a laser generator, a laser deflector, a laser scanning lens system, and a light receiving portion.

In addition, in a image forming apparatus such as copy machines and printers, etc., use a electronic photograph process method which frequently employs a monochromatic laser beam. Namely, such an apparatus configured to form an electrostatic latent image onto a photosensitive object by leading a laser beam emitted from a laser beam emitting device such as a semiconductor laser diode to a polygon deflecting mirror rotating at high speed as parallel light through a collimator lens on a prism complex, etc., and thereafter changing reflection direction of the laser beam by the rotation of the deflecting mirror.

An example of such an optical scanning apparatus is disclosed in Japanese Patent Laid-Open Publication No. Hei5 (1990)-161410 which will be hereafter explained as prior art with reference to FIG. 1.

Referring to FIG. 1, the laser beam emitted from a source of light 1 is scanned onto an image formation plane (photosensitive drum surface) 9 by way of a rotating asymmetric aspherical lens F-θ 6' for scanning the laser beam is composed of a first lens 6 with a rotating symmetric axis whose first plane and second plane are a spherical plane on a flat plane and a second lens 7 whose third plane is the cylindrical lens and whose fourth lens is the rotating asymmetric aspherical lens for correcting aberration.

In addition, the trace of the spot in the image formation plane 9 moves uniformly by the first plane and second plane of the scanning lens 6' when the rotating polygon mirror 5 is rotated with equal angles.

On the other hand, the effect of vibration of the rotating polygon mirror 5 is compensated by the third cylindrical plane and fourth aspherical plane of the second lens 7 located between the rotating polygon mirror 5, the first lens 6 and the image formation plane 9.

However, the prior art of FIG. 1 has problems as follows.

Firstly, the size of the lens must be large because the third plane and the fourth plane are located between the scanning lens and the image formation plane, whereby the lens may be greatly influenced by contraction/expansion due to humidity and temperature and the size of the entire optical system must be large.

Secondly, because the third plane and the fourth plane are consist of the cylindrical lens and the aspherical lens respectively, even if they are manufactured by using a mould, the yield is likely to decrease when manufacturing and assembling the lens as it is difficult to properly align the two plane axes.

SUMMARY OF THE INVENTION

In view of the above problems, it is a object of this invention to provide an optical scanning apparatus which facilitates the manufacture and assembly/adjustment of the lens through minimizing the size of a cylindrical lens and can reduce the number of manufacturing step by providing the cylindrical lens between axis-symmetric aspherical lenses.

It is another object of this invention to provide an optical scanning apparatus which facilitates the assembly and adjustment of the lens in a mainscanning direction and a subscanning direction perpendicular to the mainscanning direction by making magnification of an axis-symmetric aspherical lens and magnification of the cylindrical lens independent.

In order to accomplish the above objects, in accordance to this invention, in an optical scanning apparatus for use in various optical equipment using a laser beam, the optical scanning apparatus comprises a laser diode source of light, a collimator lens, a first cylindrical lens, a rotating polygon mirror, and an optical scanning means consisting of two lenses provided between the rotating polygon mirror and an image formation plane and having independent magnifications in mainscanning/subscanning directions, wherein the optical scanning means is composed of a second cylindrical lens located in the vicinity of the rotating polygon mirror for image-forming light in the subscanning direction and a scanning lens provided between the second cylindrical lens and the image formation plane for image-forming light in the mainscanning direction.

BRIEF DESCRIPTION OF THE DRAWINGS

This invention will be understood more fully from the detailed description given below and the accompanying drawings of the preferred embodiment of this invention, which, however, should not be taken to limit the invention, but are for only explanation and understanding.

In the drawings.

DETAILED DESCRIPTION OF THE PREFERRED EMBODIMENT

Figure 1:
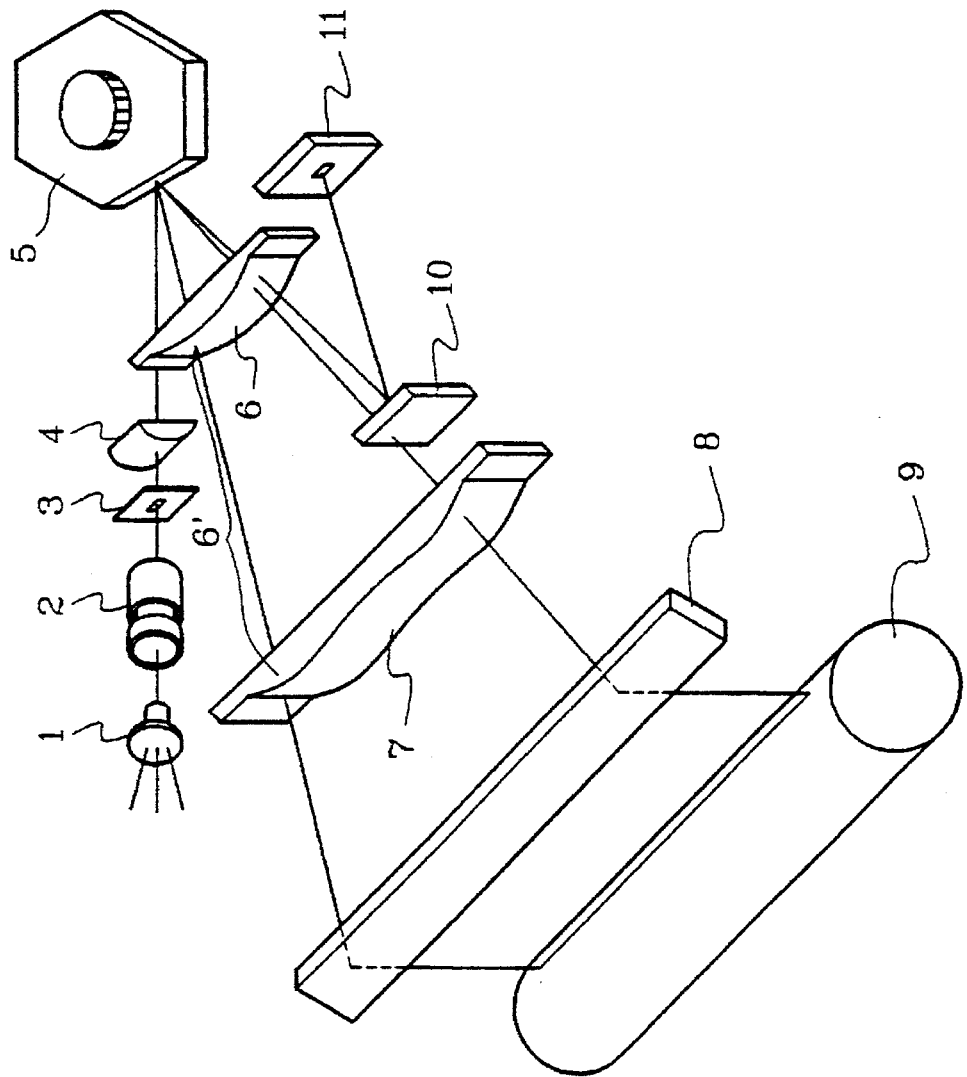
FIG. 1 is a perspective view of a conventional optical scanning apparatus.
Figure 2:
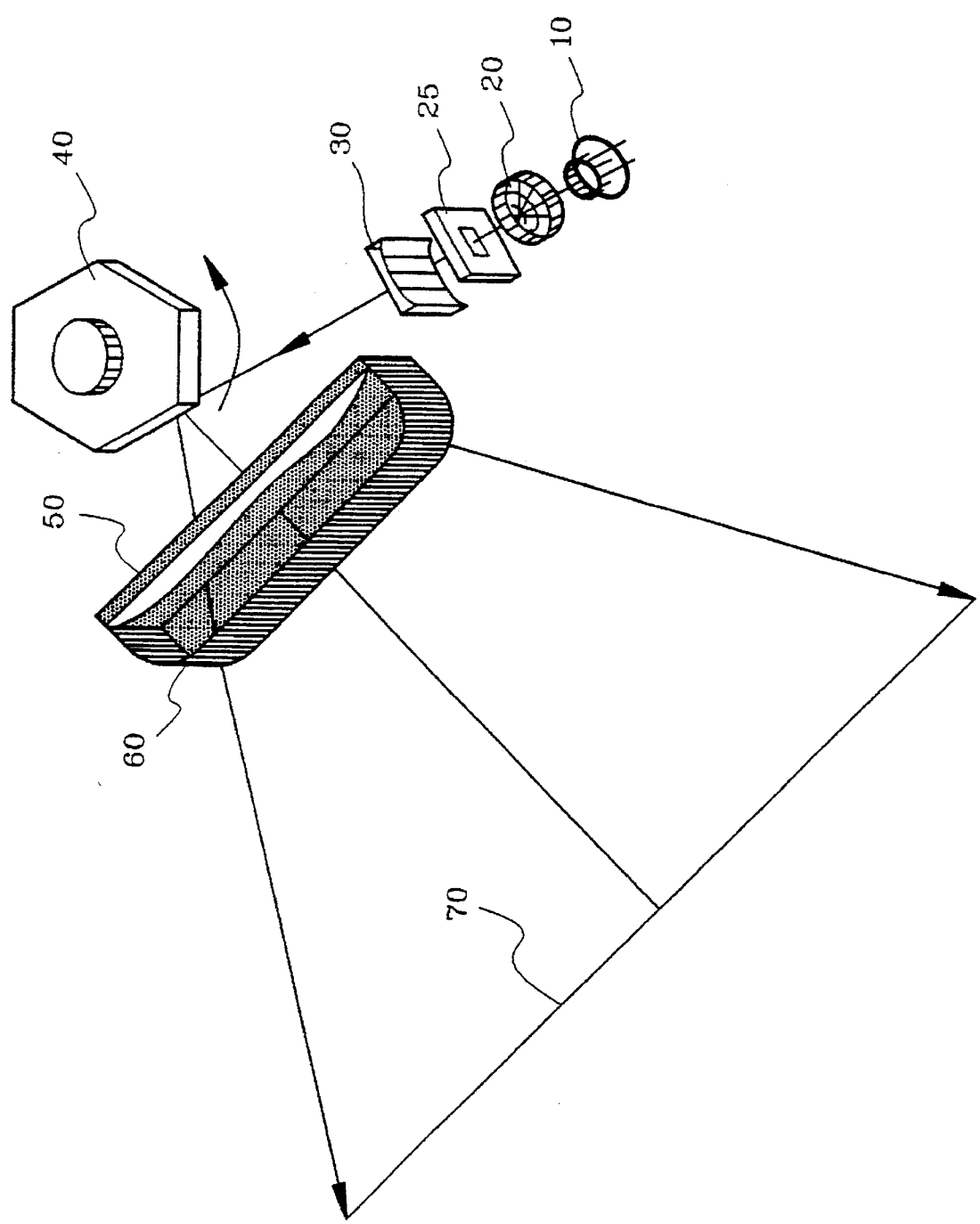
FIG. 2 is a perspective view of an optical scanning apparatus according to an embodiment of this invention.
Figure 3:
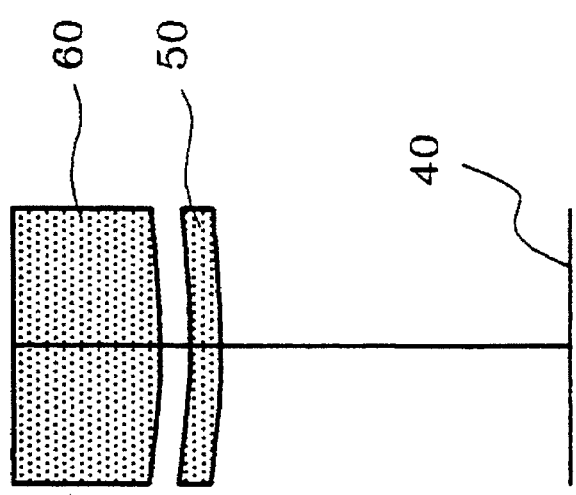
FIG. 3A is a plane view illustrating the shape of the lens in a mainscanning direction in an optical scanning apparatus according to an embodiment of this invention.
FIG. 3B is a sectional view illustrating the shape of the lens in a subscanning direction in an optical scanning apparatus according to an embodiment of this invention.
Figure 3:
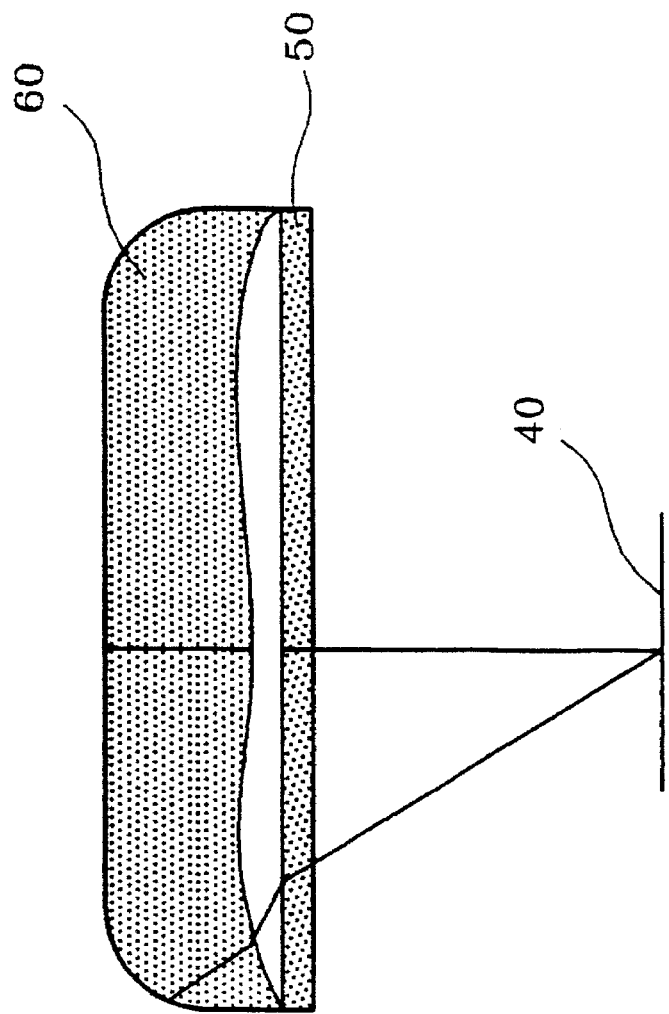

FIG. 2 is a perspective view of an optical scanning apparatus according to an embodiment of this invention. FIG. 3A is a plane view illustrating the shape of the lens in a mainscanning direction in an optical scanning apparatus according to an embodiment of this invention. FIG. 3B is a sectional view illustrating the shape of the lens in a subscanning direction in an optical scanning apparatus according to an embodiment of this invention.

Referring to FIGS. 2, 3A, and 3B, an optical scanning apparatus includes a laser diode as a source of light 10, a collimator lens 20, a first cylindrical lens 30, a rotating polygon mirror 40, a second cylindrical lens 50 located in the vicinity of the rotating polygon mirror 40 for image-forming light in a subscanning direction, and a scanning lens 60 provided between the second cylindrical lens and an image formation plane 70 for image-forming light in a mainscanning direction.

Here, a miniaturization of the lens is possible through minimizing the length of the cylindrical lens by locating the second cylindrical lens 50 between the rotating polygon mirror 40 and the scanning lens 60.

Furthermore, because the scanning lens 60 has an axis-symmetric aspherical plane having an F-θ function, the moulding manufacture the lens by injection moulding simplified.

Namely, the scanning lens 60 uses the axis-symmetric lens having not different curvatures but equal curvatures symmetric with respect to an optical axis in rectangular coordinates. Such a construction of the lens is configured 50 have primarily an F-θ function in a direction to be printed in the image formation plane 7. In addition, the second cylindrical lens 50 is provided to compensate for a deviation by the vibration of the rotating polygon mirror 40 to scan the laser beam.

At this time, the second cylindrical lens 50 and the scanning lens 60 are magnifications in mainscanning/subscanning directions, and the lenses are able to magnify in the mainscanning direction and the subscanning direction independently.

Furthermore, the curvature of the second cylindrical lens 50 is configured to have a spherical plane and, at the same time, have a convex shape directed toward the rotating polygon mirror 40.

In addition, the axis-symmetric aspherical scanning lens 60 uses spherical expanding coefficients up to an 8th order as well as conic constants.

In addition, the ratio of the distance between the rotating polygon mirror 40 and the second cylindrical lens 50 to the distance between the second cylindrical lens 50 and the axis-symmetric aspherical scanning lens 60 must be 10/1 or more.

Figure 4:
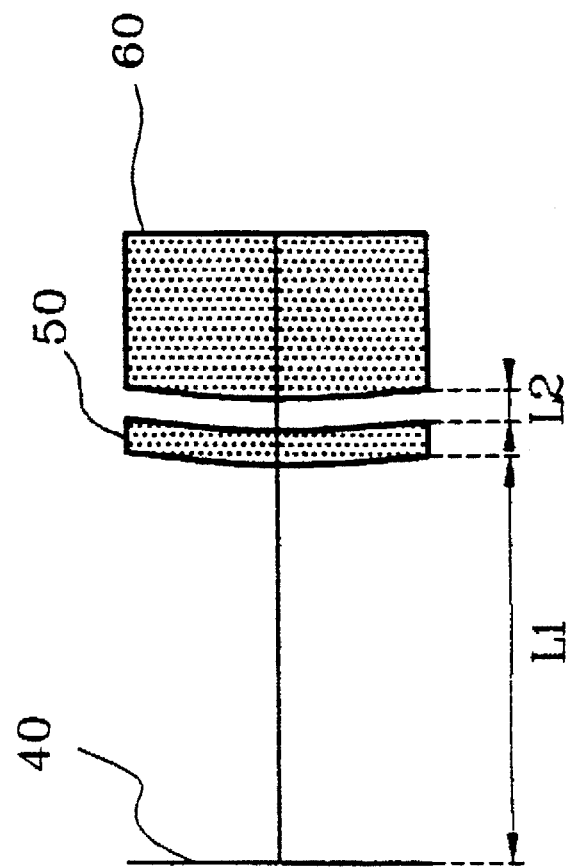
FIG. 4 is an explanation view illustrating the relationship between mainscanning/subscanning distance according to an embodiment of this invention.

Namely, as shown in FIG. 4, the distance L1 between the rotating polygon mirror 40 and the second cylindrical lens 50 must be at least ten times as long as the distance L2 between the second cylindrical lens 50 and the scanning lens 60. The medium filling in the distance between L1 and L2 is air.

On the other hand, at least a conic constant of the axis-symmetric aspherical scanning lens 60 has (−) value, and the curvature of the lens 60 is configured to have the convex shape simultaneously directed toward the rotating polygon mirror 40.

In addition, the curvature radius of the plane of the image formation plane 70 direction must be larger in absolute value than that of the plane of the rotating polygon mirror 40 direction of an axis-symmetric aspherical scanning lens 60.

With such a constructed optical scanning apparatus, the laser beam emitted from the source of light 10 becomes parallel by means of the collimator lens 20 and then becomes parallel in the mainscanning direction, and receives in the subscanning direction perpendicular to the mainscanning direction by means of the first cylindrical lens 30.

Thereafter, after this laser beam is reflected by the rotating polygon mirror 40 fixed to the axis of a spindle motor (not shown), it is image-formed as a very small-sized spot on the image formation plane 70 (photosensitive drum plan) through the second cylindrical lens 50 and the axis-symmetric aspherical scanning lens 60.

In addition, in order that the light parallel in the mainscanning direction and received in the subscanning direction may be simultaneously image-formed on the photosensitive drum plane 70, the lens must have the contents of Table 1 described below.

TABLE 1

| specification lens | plane | curvature in the mainscanning direction | curvature in the subscanning direction | distance (thickness) | refractive index | arpherical coefficient in the mainscanning direction | | remark |
|---|---|---|---|---|---|---|---|---|
| cylindrical lens | first plane | ∞ | 427.1168 | 2.5 | 1.49 | — | | "mm" unit of |
| scanning lens | second plane | ∞ | 318.5729 | 2.0 | Air | — | | the curvature |
| | third plane | 45.6093 | same ar the left | 10.75 | 1.49 | K | −11.7849 | |
| | | | | | | A1 | −0.1051245E-04 | |
| | | | | | | A2 | −0.269965E-09 | |
| | | | | | | A3 | 0.2535756E-12 | |
| | | | | | | A4 | 0.3650004E-15 | |
| | | | | | | A5 | 0.3441389E-18 | |
| | | | | | | A6 | 0.2394971E-21 | |
| | | | | | | A7 | 0.8007553E-24 | |
| | | | | | | A8 | −0.5622229E-27 | |
| | fourth plane | 159.1322 | same ar the left | 117.2432 | air | K | −0.925 | |
| | | | | | | A1 | −0.1566041E-04 | |
| | | | | | | A2 | 0.6846949E-08 | |
| | | | | | | A3 | −0.2772720E-12 | |
| | | | | | | A4 | −0.4221732E-14 | |
| | | | | | | A5 | −0.2789384E-17 | |
| | | | | | | A6 | 0.1212056E-20 | |
| | | | | | | A7 | −0.7169416E-24 | |
| | | | | | | A8 | −0.5622228E-27 | |

In addition, the two lenses mentioned above use a plastic material whose refractive index (n) is 1.48~1.6 and Abe constant is 30~60.

As explained hereinbefore, according to the optical scanning apparatus of this invention, the two lenses which may be injection moulded and use plastic material with the above mentioned condition form an optical scanning system. The cylindrical lens of these two lenses is located between the rotating polygon mirror and the scanning lens for image-forming light in the subscanning direction, the scanning lens of these two lenses is located between the cylindrical lens and the image formation plane for image-forming light in the mainscanning direction. Also, magnification of the main-scanning direction and that of the subscanning direction are independent. According to such a construction, the miniaturization of the lens is possible, the manufacture, assembly and adjustment of the lens is simplified, the number of the manufacturing steps of the lens may be reduced, and the production of the lens using moulding is also eimplified.

What is claimed is:

1. In an optical scanning apparatus including a laser diode as a source of light, a collimator lens, a first cylindrical lens, and a rotating polygon mirror, for use in various optical equipment using a laser beam, the optical scanning apparatus further comprising:

an optical scanning means consisting of two lenses provided between the rotating polygon mirror and an image formation plane and having independent magnifications in mainscanning/subscanning directions, wherein the optical scanning means is composed of a second cylindrical lens located in the vicinity of the rotating polygon mirror for image forming light in the subscanning direction and a scanning lens provided between the second cylindrical lens and the image formation plane for image-forming light in the main-scanning direction; wherein the scanning lens is an axis-symmetric aspherical lens with an F-φ function.

2. The optical scanning apparatus according to claim 1, wherein the scanning lens has conic constants and aspherical expanding coefficients up to an 8th order.

3. The optical scanning apparatus according to claim 2, wherein at least a conic constant has (−) value.

4. The optical scanning apparatus according to claim 1, wherein the curvature of the second cylindrical lens is configured to have a spherical plane.

5. The optical scanning apparatus according to claim 1, wherein the curvature of the second cylindrical lens is configured to have a convex shape directed toward the rotating polygon mirror.

6. The optical scanning apparatus according to claim 1, wherein the curvature of the scanning lens is configured to have a convex shape directed toward the rotating polygon mirror.

7. The optical scanning apparatus according to claim 1, wherein the curvature radius of the plane of the image formation plane direction of the scanning lens is configured to be larger in absolute value than that of the plane of the rotating polygon mirror direction of the scanning lens.

8. In an optical scanning apparatus including a laser diode as a source of light, a collimator lens, a first cylindrical lens, and a rotating polygon mirror, for use in various optical equipment using a laser beam, the optical scanning apparatus further comprising:

an optical scanning means consisting of two lenses provided between the rotating polygon mirror and an image formation plane and having independent magnifications in mainscanning/subscanning directions, wherein the optical scanning means is composed of a second cylindrical lens located in the vicinity of the rotating polygon mirror for image forming light in the subscanning direction and a scanning lens provided between the second cylindrical lens and the image formation plane for image-forming light in the main-scanning direction; wherein the ratio of the distance between the rotating polygon mirror and the second cylindrical lens to the distance between the second cylindrical lens and the scanning lens is set to be at least 10/1.

9. The optical scanning apparatus according to claim 8, wherein the curvature of the second cylindrical lens is configured to have a spherical plane.

10. The optical scanning apparatus according to claim 9, wherein the curvature of the second cylindrical lens is configured to have a convex shape directed toward the rotating polygon mirror.

11. The optical scanning apparatus according to claim 8, wherein the curvature of the scanning lens is configured to have a convex shape directed toward the rotating polygon mirror.

12. The optical scanning apparatus according to claim 8, wherein the curvature radius of the plane of the image formation plane direction of the scanning lens is configured to be larger in absolute value than that of the plane of the rotating polygon mirror direction of the scanning lens.

13. In an optical scanning apparatus including a laser diode as a source of light, a collimator lens, a first cylindrical lens, and a rotating polygon mirror, for use in various optical equipment using a laser beam, the optical scanning apparatus further comprising:

an optical scanning means consisting of two lenses provided between the rotating polygon mirror and an image formation plane and having independent magnifications in mainscanning/subscanning directions, wherein the optical scanning means is composed of a second cylindrical lens located in the vicinity of the rotating polygon mirror for image forming light in the subscanning direction and a scanning lens provided between the second cylindrical lens and the image formation plane for image-forming light in the main-scanning direction; wherein the material of the optical scanning means is plastic which may be injection moulded and whose refractive index (n) is 1.48~1.6 and Ave constant is 30~60.

14. The optical scanning apparatus according to claim 13, wherein the curvature of the second cylindrical lens is configured to have a spherical plane.

15. The optical scanning apparatus according to claim 14, wherein the curvature of the second cylindrical lens is configured to have a convex shape directed toward the rotating polygon mirror.

16. The optical scanning apparatus according to claim 13, wherein the curvature of the scanning lens is configured to have a convex shape directed toward the rotating polygon mirror.

17. The optical scanning apparatus according to claim 13, wherein the curvature radius of the plane of the image formation plane direction of the scanning lens is configured to be larger in absolute value than that of the plane of the rotating polygon mirror direction of the scanning lens.

* * * * *